(12) United States Patent
Schanderl et al.

(10) Patent No.: US 10,406,949 B2
(45) Date of Patent: Sep. 10, 2019

(54) SPRUNG VEHICLE SEAT

(71) Applicant: GRAMMER AG, Amberg (DE)

(72) Inventors: Florian Schanderl, Schwarzenfeld (DE); Johann Meier, Fensterbach (DE)

(73) Assignee: GRAMMER AG, Amberg (DE)

( * ) Notice: Subject to any disclaimer, the term of this patent is extended or adjusted under 35 U.S.C. 154(b) by 43 days.

(21) Appl. No.: 15/837,684

(22) Filed: Dec. 11, 2017

(65) Prior Publication Data

US 2018/0162242 A1    Jun. 14, 2018

(30) Foreign Application Priority Data

Dec. 13, 2016 (DE) .......................... 10 2016 124 228

(51) Int. Cl.
  *B60N 2/02*   (2006.01)
  *B60N 2/50*   (2006.01)
  *B60N 2/54*   (2006.01)
  *F16F 1/44*   (2006.01)

(52) U.S. Cl.
  CPC ............ *B60N 2/505* (2013.01); *B60N 2/502* (2013.01); *B60N 2/507* (2013.01); *B60N 2/508* (2013.01); *B60N 2/542* (2013.01); *F16F 1/44* (2013.01)

(58) Field of Classification Search
  CPC ........... F16F 1/44; B60N 2/505; B60N 2/502; B60N 2/507; B60N 2/508; B60N 2/542
  See application file for complete search history.

(56) References Cited

U.S. PATENT DOCUMENTS

| 5,876,085 | A | 3/1999 | Hill | |
|---|---|---|---|---|
| 9,937,832 | B2* | 4/2018 | Haller | B60N 2/501 |
| 2015/0232005 | A1* | 8/2015 | Haller | B60N 2/505 |
| | | | | 248/562 |
| 2016/0176326 | A1* | 6/2016 | Catton | B60N 2/508 |
| | | | | 248/636 |
| 2017/0166100 | A1* | 6/2017 | Lorey | B60N 2/505 |

FOREIGN PATENT DOCUMENTS

| DE | 971666 | 3/1959 |
|---|---|---|
| EP | 2416030 | 2/2012 |

OTHER PUBLICATIONS

Extended Search Report for European Patent Application No. 17203455.5, dated May 16, 2018, 3 pages.

* cited by examiner

*Primary Examiner* — Lori L Lyjak
(74) *Attorney, Agent, or Firm* — Sheridan Ross P.C.

(57) ABSTRACT

Vehicle seat comprising a vehicle seat upper part and a vehicle seat lower part, the vehicle seat upper part being movable relative to the vehicle seat lower part, and the vehicle seat upper part being able to be sprung and damped, relative to the vehicle seat lower part, by a suspension and damping element, the suspension and damping element comprising a reversibly deformable plastics element and an adjusting element, the plastics element and the adjusting element being in operative contact, and the spring characteristics of the suspension and damping element being able to be adjusted depending on the position of the adjusting element relative to the plastics element.

12 Claims, 14 Drawing Sheets

SPRUNG VEHICLE SEAT

CROSS-REFERENCE TO RELATED APPLICATIONS

This application claims the benefit of German Patent Application No. DE 10 2016 124 228.4 filed Dec. 13, 2016, the entire contents of which are incorporated herein by reference.

FIELD

The invention relates to a vehicle seat comprising a vehicle seat upper part and a vehicle seat lower part, the vehicle seat upper part being movable relative to the vehicle seat lower part, and the vehicle seat upper part being able to be sprung and damped, relative to the vehicle seat lower part, by a suspension and damping element.

BACKGROUND

Various embodiments of a vehicle seat of this kind are known from the prior art, it being possible for the spring characteristics of the pneumatic spring to be adjusted using complex structures, for example using additional volumes for a pneumatic spring. However, structures of this kind are complex, costly and require a large amount of space inside a vehicle.

SUMMARY

The object of the present invention is therefore that of providing a vehicle seat having a suspension that is simple, cost-effective and low-maintenance.

Embodiments of the present disclosure provide a vehicle seat comprising a vehicle seat upper part and a vehicle seat lower part, the vehicle seat upper part being movable relative to the vehicle seat lower part, and the vehicle seat upper part being sprung and damped, relative to the vehicle seat lower part, by a suspension and damping element, wherein the suspension and damping element comprises a reversibly deformable plastics element and an adjusting element, the plastics element and the adjusting element being in operative contact, and the spring characteristics of the suspension and damping element being able to be adjusted depending on the position of the adjusting element relative to the plastics element. Additional embodiments of the invention are to be found in the following description.

The basic concept of the invention is a vehicle seat comprising a vehicle seat upper part and a vehicle seat lower part, the vehicle seat upper part being movable relative to the vehicle seat lower part, and the vehicle seat upper part being able to be sprung and damped, relative to the vehicle seat lower part, by a suspension and damping element, the suspension and damping element comprising a reversibly deformable plastics element and an adjusting element, the plastics element and the adjusting element being in operative contact, and the spring characteristics of the suspension and damping element being able to be adjusted depending on the position of the adjusting element relative to the plastics element.

Here, "reversibly deformable" is in particular intended to mean that, after the plastics element has been deformed and there is no longer any force acting on the plastics element, said element deforms back into its original shape.

When the vehicle seat upper part moves relative to the vehicle seat lower part, i.e. for example when a force is acting on the vehicle seat due to outside influences, the plastics element is deformed by the adjusting means that is in operative contact with the plastics element, which deformation causes damping and/or suspension of the movement of the vehicle seat upper part relative to the vehicle seat lower part.

According to the invention, the spring characteristics of the suspension and damping element are carried out using the adjusting element. The spring characteristics of the suspension and damping element can be adjusted depending on the position of the adjusting element relative to the plastics element.

According to a first preferred embodiment, the adjusting means has a rotational axis that extends in a vehicle seat width direction or a rotational axis that extends in a vehicle seat length direction, the adjusting means being mounted so as to be rotatable about said rotational axis, and has at least three different functional regions, a first functional region being rectangular, a second functional region comprising first elevations and first depressions that are arranged perpendicularly to the vehicle seat width direction, and a third functional region comprising second elevations and second depressions that are arranged perpendicularly to the vehicle seat width direction or perpendicularly to the vehicle seat length direction.

In particular, the functional regions can be brought into contact with the plastics element by rotating the adjusting means, such that just one functional region is in operative contact with the plastics element in each case. More preferably, the first functional region is planar.

According to a further preferred embodiment, the design of the first elevations and the first depressions, in particular the extension perpendicularly to the rotational axis, differs in each case from the second elevations and second depressions.

In this case, suspension and/or damping of the vehicle seat is achieved in the following manner. If the second or third functional region is in operative contact with the plastics element on account of the adjustment of the position of the adjusting means, the following occurs when the vehicle seat upper part moves relative to the vehicle seat lower part. The plastics element is loaded by the adjusting means and is loaded more heavily in the region of the elevations than in the region of the depressions. The further the elevations extend perpendicularly to the rotational axis, the smaller is the overall loading of the plastics element by the adjusting means, since the plastics element can escape into the depressions in part.

If the first functional region of the adjusting means is in operative contact with the plastics element, the plastics element, in the event of movement of the vehicle seat upper part relative to the vehicle seat lower part, the plastics element is loaded and deformed in a two-dimensional manner, such that the plastics element cannot escape into depressions as no depressions are provided. In this case, the spring characteristics have a steeper course, since the plastics element must be compressed, as is the case in the second or third functional region.

Preferably, the respectively associated elevations and depressions of the adjusting means are arranged alternately behind one another in the vehicle seat width direction or in the vehicle seat length direction.

Particularly advantageously, the rotational axis and the plastics element are arranged so as to extend in the vehicle seat width direction or in the vehicle seat length direction.

According to a second preferred embodiment, the adjusting means has a rotational axis that extends in a vehicle seat width direction or a rotational axis that extends in a vehicle seat length direction, the adjusting means being mounted so as to be rotatable about said rotational axis, the adjusting means being formed as a shaft comprising third elevations and third depressions, a depression following an elevation in each case, and an elevation following each depression, viewed in the vehicle seat width direction, the elevations tapering eccentrically in cross section when viewed in the vehicle seat width direction.

The operating principle of this second embodiment is the same as the operating principle of the first embodiment, but these embodiments differ in the design of the adjusting means.

According to the second embodiment, the third elevations taper eccentrically in cross section. The cross section of the smallest taper preferably substantially corresponds to a first circle having a centre on the rotational axis, the cross section of the largest taper corresponding to a second circle having a centre on an eccentric shaft, having a radius, such that the first circle and the second circle touch at at least one point when viewed in cross section in the vehicle seat width direction or in the vehicle seat length direction.

The fact that the first and the second circle touch at least at one point means that the contact surface, i.e. a partial surface of the eccentric shaft, produces a continuous surface which is equivalent to the first functional region.

On account of the eccentric taper, rotating the adjusting means can produce an infinite number of functional regions comprising elevations and depressions, making it possible to precisely adjust the spring characteristics.

According to a third embodiment, the adjusting means can be moved in a vehicle seat length direction and is substantially cuboid, the adjusting means having first regions, the extent of which, in a vehicle seat height direction, continuously increases to the front or to the rear, viewed in the vehicle seat length direction, in order to form fourth depressions, and second regions which form fourth elevations, viewed in the vehicle seat height direction.

Moving the adjusting means according to the third embodiment while moving the adjusting means changes the extent of the elevations and/or the depressions that are in operative contact with the plastics element. This achieves the same effect as that of the first or the second embodiment, specifically that the spring characteristics can be adjusted accordingly.

According to a further preferred embodiment, the spring characteristics of the suspension and damping element can be further changed if the plastics element comprises at least one recess, the recess preferably being formed as a through-opening. The through-opening extends in the vehicle seat length direction when the adjusting means extends in the vehicle seat width direction, and vice versa.

According to a further preferred embodiment, the plastics element is substantially cuboid, the longitudinal extension of the plastics element being greater than the height extension or the depth extension of the plastics element.

The spring characteristics of the suspension and damping element can be influenced in the following manner by recesses, in particular through-openings, in the plastics element. Particularly preferably, in the embodiment in question, the elevations are arranged directly above the recesses when viewed in the vehicle seat height direction. The movement of the vehicle seat upper part relative to the vehicle seat lower part causes the plastics element to deform, less damping and/or suspension of the vehicle seat occurring on account of the recesses, since less material needs to be deformed by the adjusting element.

According to a further preferred embodiment, the adjusting means can be adjusted by actuating an adjusting element in its position. The adjusting element is advantageously at least operatively connected to the adjusting means, preferably rigidly connected to the adjusting means in the first and second embodiment, and preferably mounted so as to be rotatable relative to the adjusting means in the third embodiment, such that the adjusting means can be moved by rotating the adjusting element about a rotational axis of the adjusting means.

The adjusting element preferably comprises a rotary knob or the like.

According to a particularly preferred embodiment, the recesses, in particular through-openings, of the plastics element, and, depending on the position of the adjusting element in the first embodiment, the elevations, are arranged above one another in the vehicle seat height direction.

According to a further preferred embodiment, the vehicle seat upper part and the vehicle seat lower part are interconnected by means of a scissor-action frame. Alternatively, the vehicle seat upper part has at least one first and at least one second swivel axis, and the vehicle seat lower part has at least one third and at least one fourth swivel axis, the first and third swivel axes being interconnected by means of at least one first connecting link, and the second and fourth swivel axes being interconnected by means of at least one second connecting link.

Overall, therefore, the invention relates to a vehicle seat comprising a scissor-action frame, or to a vehicle seat having a parallel arrangement of the vehicle seat upper part and of the vehicle seat lower part.

According to a further embodiment, the plastics element consists of Cellasto and/or Vulkollan at least in part. Said materials are cellular and open-pored polyurethane (PU) foams which are particularly durable and loadable. It is also conceivable here, for the plastics element to consist of a mixture of Cellasto and Vulkollan or for these materials to be mixed with other PU foams.

More preferably, the adjusting means is connected to the vehicle seat upper part and the plastics element is connected to the vehicle seat lower part, or the adjusting means is connected to the vehicle seat lower part and the plastics element is connected to the vehicle seat lower part.

According to a further embodiment, the adjusting means is formed of a plastics material or a metal. In this case, the adjusting means can be produced by machining or by means of an injection moulding process.

Further advantageous embodiments emerge from the dependent claims.

BRIEF DESCRIPTION OF THE DRAWINGS

Additional aims, advantages and expedient uses of the present invention can be found in the following description in conjunction with the drawings, in which.

In the drawings, identical components are to be provided with corresponding reference numerals in each case. For the sake of clarity, in some of the drawings, components that have been identified elsewhere may not be provided with a reference numeral.

DETAILED DESCRIPTION

The drawings firstly show different embodiments of the vehicle seat according to the invention, and the subsequent drawings more precisely illustrate the adjusting means according to different embodiments, and the mode of operation.

Figure 1:
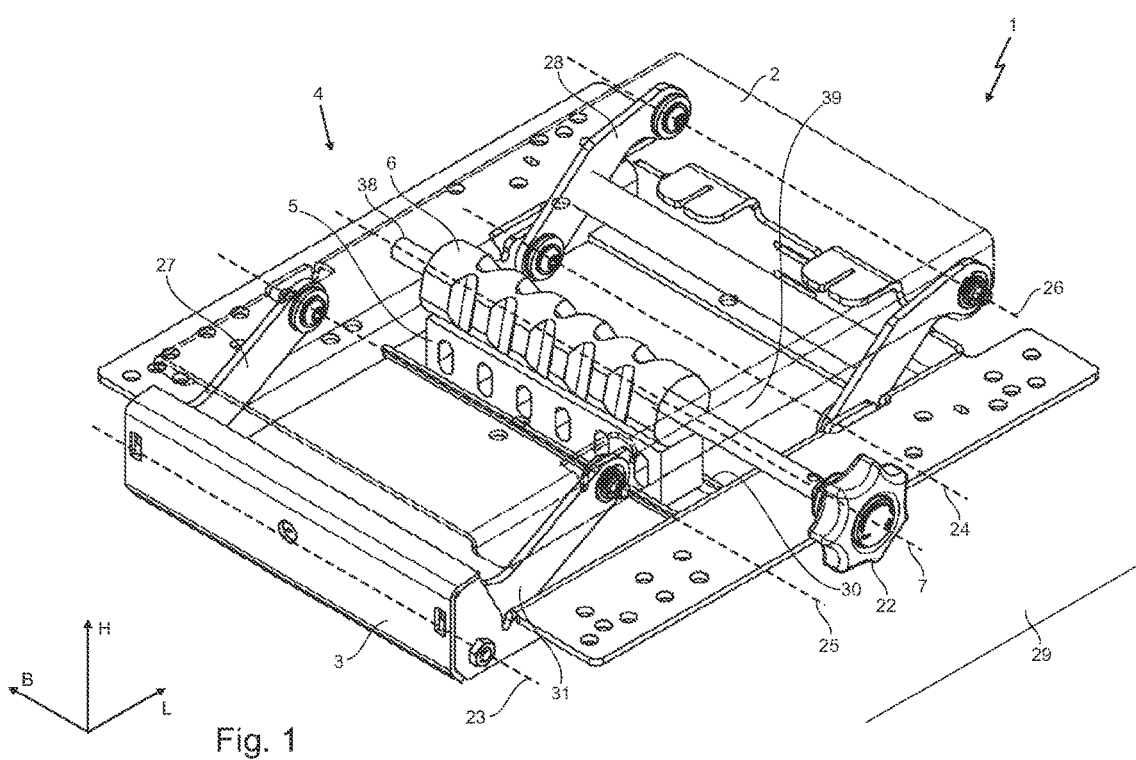
FIG. 1 shows a first embodiment.

FIG. 1 shows a vehicle seat 1, although an upper vehicle seat element comprising a seat part and a backrest are not shown here. Only a vehicle seat substructure is shown.

Here, the vehicle seat 1 comprises a vehicle seat upper part 2 and a vehicle seat lower part 3 that is connected to a body 29 of a vehicle (not shown here). Here, the vehicle seat 1 is provided with a parallel suspension, the vehicle seat upper part 2 being connected to the vehicle seat lower part 3 by means of a first 27 and a second connecting link 28. In this case, a first end 31 of the first connecting link 27 is connected to the vehicle seat lower part 3 by means of a first swivel axis 23, and a second end 32 of the first connecting link 27 is connected to the vehicle seat upper part 2 by means of a third swivel axis 25. Correspondingly, a first end 33 of the second connecting link 28 is connected to the vehicle seat lower part 3 by means of a second swivel axis 24, and the second end 34 of the second connecting link 28 is connected to the vehicle seat upper part 2 by means of a fourth swivel axis 26.

The first 23, the second 24, the third 25 and the fourth swivel axis 26 are arranged so as to extend in the vehicle seat width direction B.

As can further be seen from FIG. 1, the adjusting means 6 is connected to the vehicle seat upper part 2 so as to be rotatable about a rotational axis 7, the rotational axis 7 being arranged so as to extend in the vehicle seat width direction B. Furthermore, an adjusting element 22 is attached to the adjusting means 6, by means of which element the position of the adjusting means 6 can be changed by clockwise or anticlockwise rotation, in order to bring other functional regions of the adjusting means 6 into operative contact with the plastics element 5.

The plastics element 5, in contrast, is connected to the vehicle seat lower part 3 by means of a positioning element 30 and is connected to the vehicle seat upper part 2 by means of a first 38 and second bearing point 39.

Figure 1A:
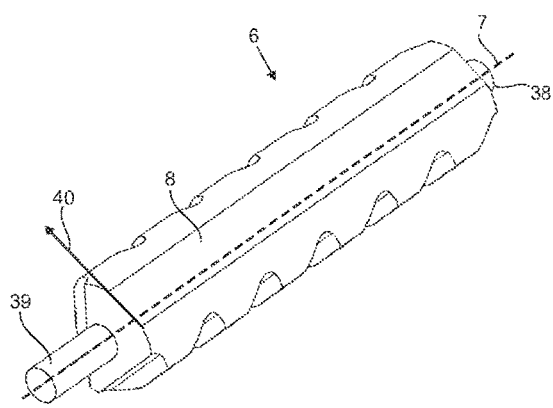
FIG. 1A shows a first functional region of the adjusting means.
Figure 1B:
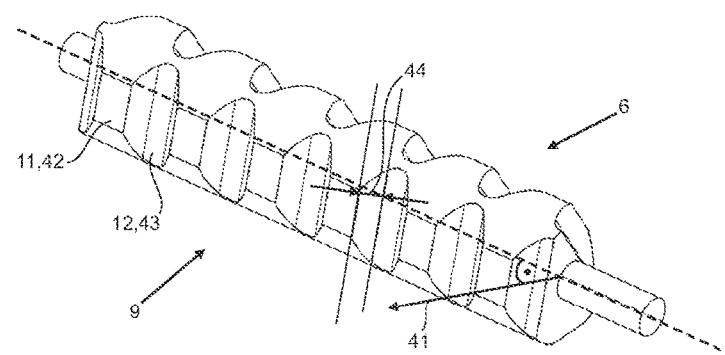
FIG. 1B shows a second functional region of the adjusting means.
Figure 1C:
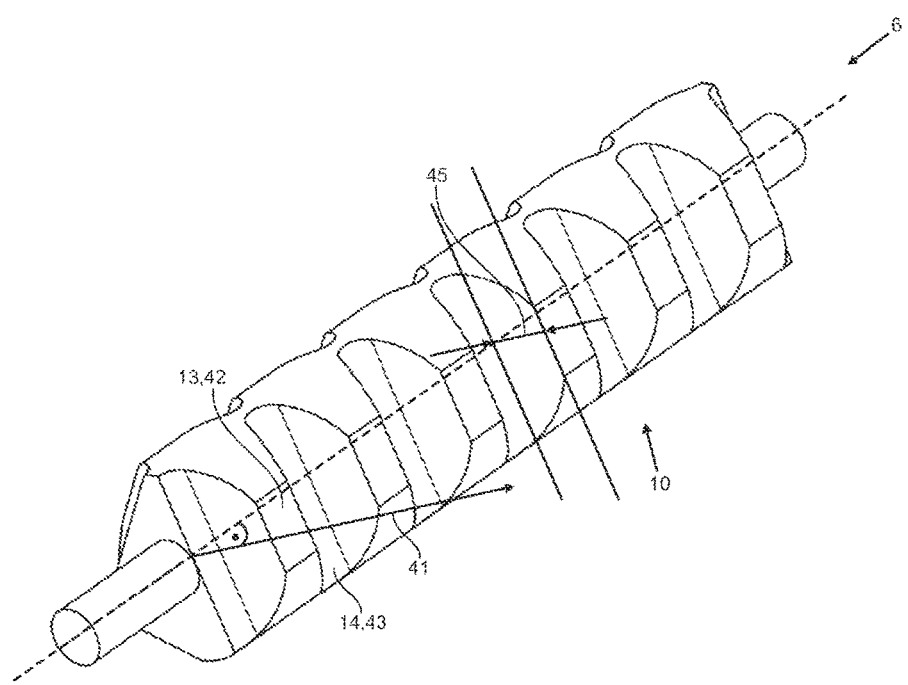
FIG. 1C shows a third functional region of the adjusting means.

FIGS. 1A, 1B and 1C show an adjusting means 6 from FIG. 1, FIG. 1A being a perspective view of a first functional region 8, FIG. 1B being a perspective view of a second functional region 9, and FIG. 1C being a perspective view of a third functional region 10 of the adjusting means 6.

In this case, the first functional region 8 is planar, meaning that the plastics element 5 can be subjected to a uniform pressure when the vehicle seat upper part 2 moves relative to the vehicle seat lower part 3. In this case, the first functional region 8 extends towards the rotational axis 7 and in a direction 40 perpendicular to the rotational axis 7. When the first functional region 8 is in operative contact with the plastics element 5, the direction 40 advantageously corresponds to the vehicle seat length direction L.

FIG. 1B shows the second functional region 9 of the adjusting means 6, the second functional region 9 comprising a plurality of first elevations 11 and a plurality of first depressions 12 which are arranged alternately behind one another when viewed in the direction of the rotational axis 7. It can further be seen that the first elevations 11 extend in a direction 41 perpendicular to the rotational axis 7. Furthermore, the first elevations 11 comprise planar regions 42 and the first depressions 12 also comprise planar regions 43, the planar regions 42, 43 being at a first distance 44 from one another in direction 41.

FIG. 1C shows the third functional region 10 of the adjusting means 6, the arrangement of the second elevations 13 and second depressions 14 being similar to the arrangement according to the second functional region 9, although the planar regions 42 and the planar regions 43 are at a second distance 45 from one another, the length of the first distance 44 being less than the length of the second distance 45.

In particular, the direction 41 corresponds to a surface normal of the planar regions 42, 43.

Figure 2A:
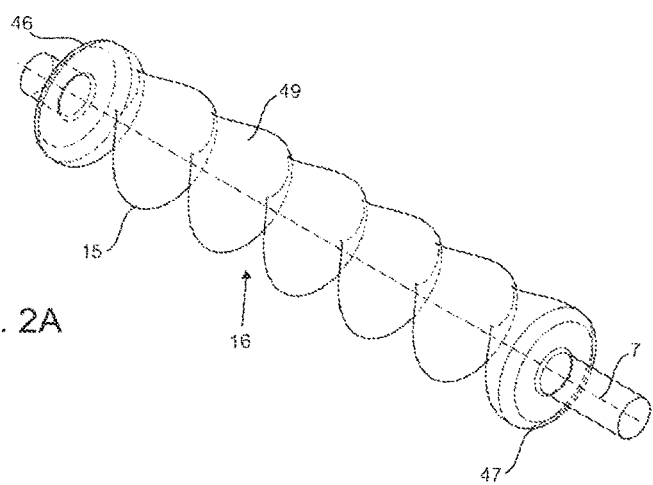
FIG. 2A shows an adjusting means according to a further embodiment.
Figure 2B:
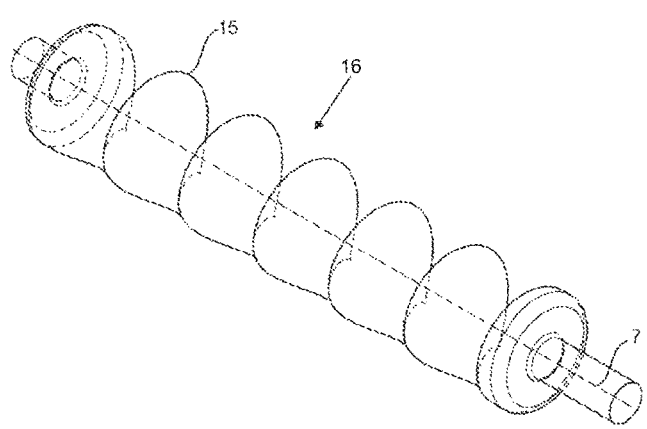
FIG. 2B is a further perspective view of the adjusting means according to FIG. 2A.

FIGS. 2A and 2B are each perspective views of an alternative embodiment of the adjusting means 6.

As can be seen in these drawings, the adjusting means 6 is formed as a shaft comprising third elevations 15 and third depressions 16, a depression 16 following an elevation 15 in each case, and an elevation 15 following each depression 16, in the direction of the rotational axis 7, the elevations 15 tapering eccentrically in cross section when viewed in the direction of the rotational axis 7. The adjusting means 6 further comprises a first end region 46 and a second end region 47 which are both formed as an elevation 15 here.

Figure 2C:
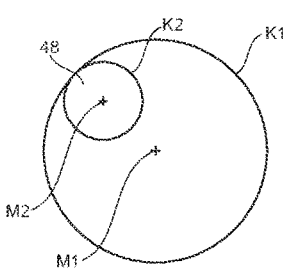
FIG. 2C is a cross section of the adjusting means according to FIG. 2A.

FIG. 2C is a cross section of the adjusting means 6 having the smallest taper, and preferably substantially corresponds to a first circle K1 having a centre M1 on the rotational axis 7, the cross section having the largest taper corresponding to a second circle K2 having a centre M2 on an eccentric shaft, having a radius, such that the first circle and the second circle touch at at least one point when viewed in cross section towards the rotational axis 7, i.e. for example in the vehicle seat width direction B or in the vehicle seat length direction L.

The fact that the first K1 and the second circle K2 touch at least at one point means that the contact surface 49, i.e. a partial surface of the eccentric shaft 48, produces a continuous surface which is equivalent to the first functional region 8.

On account of the eccentric taper, rotating the adjusting means 6 about the rotational axis 7 can produce an infinite number of functional regions comprising elevations 15 and depressions 16, making it possible to precisely adjust the spring characteristics of the suspension and damping element 4.

Figure 3:
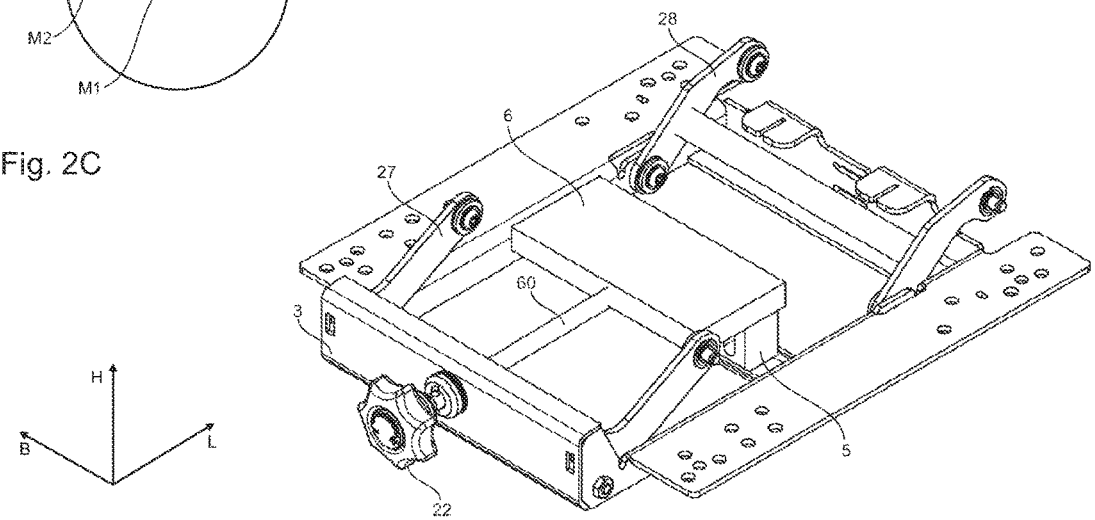
FIG. 3 shows a further embodiment.

FIG. 3 shows a similar construction to FIG. 1, but FIG. 3 differs from FIG. 1 in particular in the design of the adjusting means 6. The adjusting means 6 in FIG. 3 will be described and shown more precisely in the following drawings. In this case, the adjusting means 6 is connected to the adjusting element 22 by means of a rotational axis 60, the adjusting means 6 being designed such that rotating the adjusting element 22 about the rotational axis 60 moves the adjusting means 6 linearly backwards or forwards in the direction of the vehicle seat length direction L.

Figure 3A:
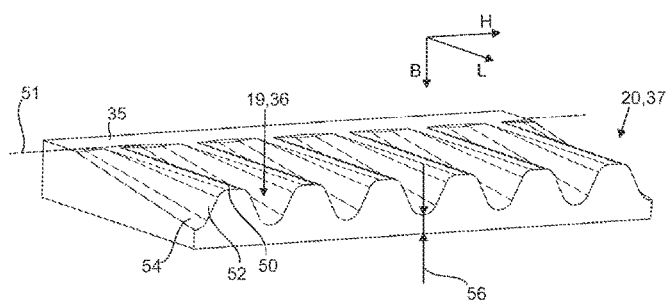
FIG. 3A is a perspective view of the adjusting means according to FIG. 3.

FIG. 3A is a perspective view of the adjusting means 6 of FIG. 3. The adjusting means 6 is substantially cuboid and comprises a planar portion 35 that extends in the vehicle seat length direction L and in the vehicle seat width direction B and is constant in the vehicle seat length direction L.

Adjoining the planar portion 35 in the vehicle seat length direction L, both first regions 36 and second regions 37 adjoin, the first regions 36 forming fourth depressions 19 and the second regions 37 forming fourth elevations 20.

As can be seen from FIG. 3A, moving the adjusting means 6 according to the third embodiment while moving the adjusting means changes the extent of the elevations 20 and/or the depressions 19 that are in operative contact with the plastics element 5. This achieves the same effect as that of the first or the second embodiment, specifically that the spring characteristics can be adjusted accordingly.

The fourth elevations 20 comprise an upper surface 50 that extends in the vehicle seat length direction L and in the vehicle seat width direction B and does not exhibit any change in the vehicle seat height direction H, but has a changeable extension in the vehicle seat width direction B.

The fourth depressions 19 are designed in the following manner. Starting at an edge 51 that is also a side of the upper surface 50, the fourth depressions 19 begin at the same time, the extent of the fourth depressions 19 increasing in the height direction H, viewed in the vehicle seat length direction L. The fourth depressions 19 comprise a first edge region 52, a second edge region 53 and a curved region 54, the first edge region 52 and the second edge region 53 being symmetrical with respect to the vehicle seat height direction H and extending in a straight line, in cross section, in the vehicle seat width direction B, and being arranged at an angle 55 to one another. In this case, the angle 55 changes continuously, in particular the angle 55 decreases, in the direction of the vehicle seat length direction L. The curved region 54 is arranged between the edge regions 52, 53 and is connected to the edge regions 52, 53, said curved region also being symmetrical with respect to the vehicle seat height direction H. In this case, a distance 56 between the depression 19 and a base surface 57 of the adjusting means 6 changes.

Figure 3B:
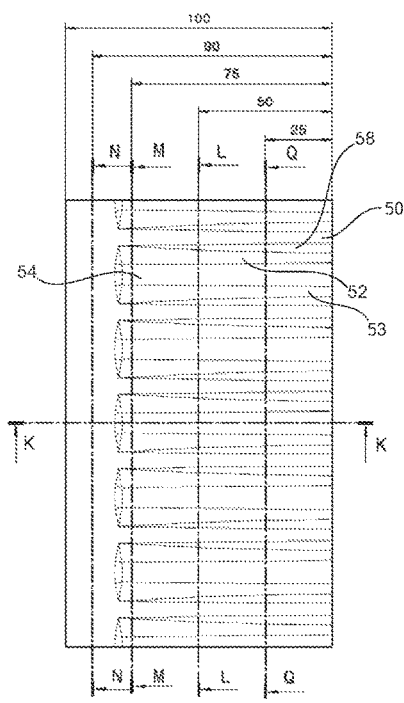
FIG. 3B is a plan view of the adjusting means according to FIG. 3.
Figures 3C, 3D:
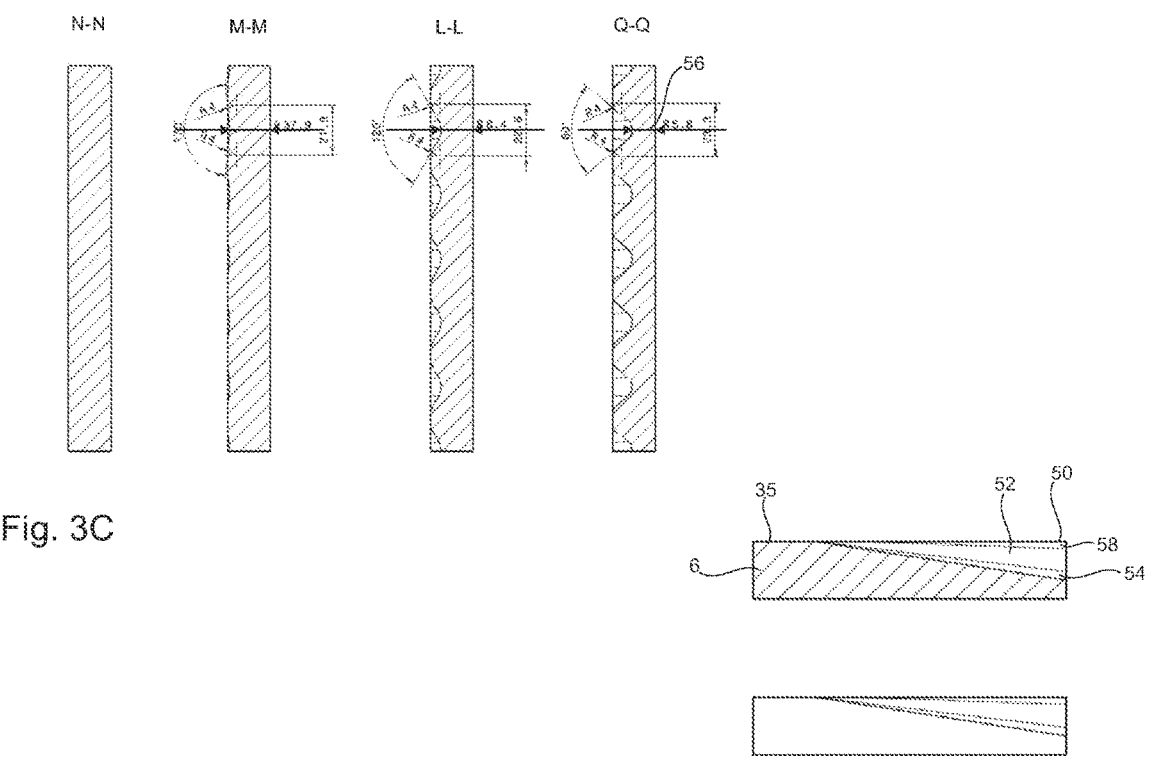
FIG. 3C shows cross sections of the adjusting means according to FIG. 3B.
FIG. 3D is a further cross section of the adjusting means according to FIG. 3B.

In addition, in order to minimise damage to the plastics element 5 by the adjusting means 6, sharp edges can be replaced with roundings 58, as can be seen for example in FIG. 3C.

FIG. 3B is a plan view of the adjusting means 6 of FIG. 3A, FIGS. 3C and 3D being the relevant cross sections of FIG. 3B.

FIGS. 4A, 4B, 5A, 5B, 6A and 6B show the different functional regions 8, 9, 10 of an adjusting means according to FIGS. 1A, 1B and 10, the suspension and damping element being unloaded, i.e. the plastics element 5 has not yet been deformed. Here, too, the operating principle corresponds to the operating principles of the adjusting means 6 according to FIGS. 2A, 2B and 3A-3D.

FIGS. 7A, 7B, 8A, 8B, 9A and 9B show the suspension and damping element 4 in a position in which it is spring-deflected but not yet fully spring-deflected. The plastics element 5 is deformed in part.

FIGS. 10A, 10B, 11A, 11B, 12A and 12B show the suspension and damping element 4 in a fully spring-deflected position. The plastics element 5 is maximally deformed.

Figure 4A:
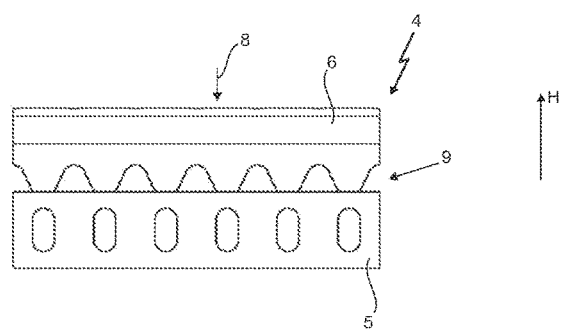
FIG. 4A is a front view of the suspension and damping element according to FIG. 1, in an unloaded state and in a first position.
Figure 4B:
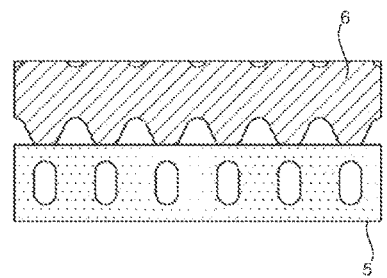
FIG. 4B is a cross section of the suspension and damping element according to FIG. 4A.
Figure 5A:
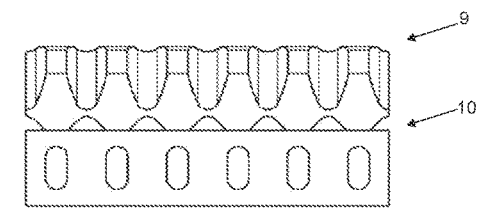
FIG. 5A is a front view of the suspension and damping element according to FIG. 1, in an unloaded state and in a second position.
Figure 5B:
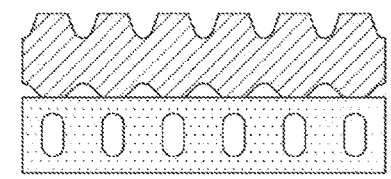
FIG. 5B is a cross section of the suspension and damping element according to FIG. 5A.
Figure 6A:
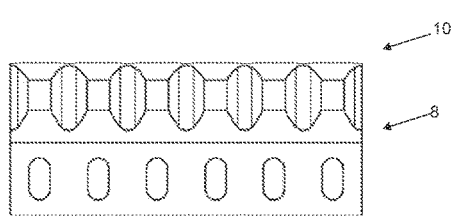
FIG. 6A is a front view of the suspension and damping element according to FIG. 1, in an unloaded state and in a third position.
Figure 6B:
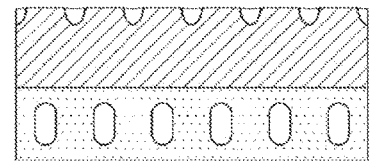
FIG. 6B is a cross section of the suspension and damping element according to FIG. 6A.
Figure 7A:
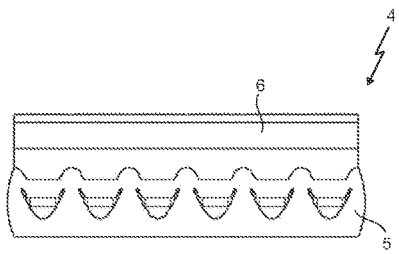
FIG. 7A is a front view of the suspension and damping element according to FIG. 1, in a partially loaded state and in the first position.
Figure 7B:
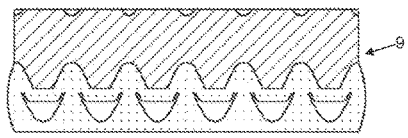
FIG. 7B is a cross section of the suspension and damping element according to FIG. 7A.
Figure 8A:
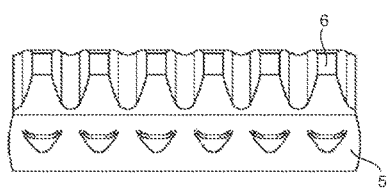
FIG. 8A is a front view of the suspension and damping element according to FIG. 1, in a partially loaded state and in the second position.
Figure 8B:
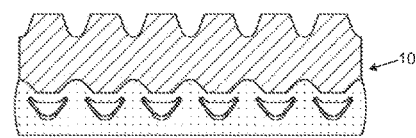
FIG. 8B is a cross section of the suspension and damping element according to FIG. 8A.
Figure 9A:
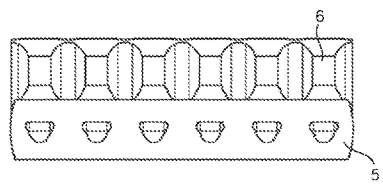
FIG. 9A is a front view of the suspension and damping element according to FIG. 1, in a partially loaded state and in the third position.
Figure 9B:
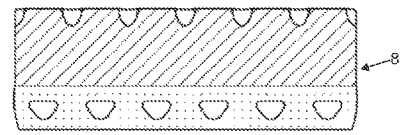
FIG. 9B is a cross section of the suspension and damping element according to FIG. 9A.

FIG. 4A shows the adjusting means 6 which is in operative contact with the plastics element 5 by means of the second functional region 9. FIG. 4B is a cross section of FIG. 4A. FIG. 5A shows the adjusting means 6 which is in operative contact with the plastics element 6 by means of the third functional region 10. Correspondingly, FIG. 5B is a cross section of FIG. 5A. FIG. 6A shows the adjusting means 6 which is in operative contact with the plastics element 5 by means of the first functional region 8. FIG. 6B is a cross section of FIG. 6A. In each case, the plastics element 5 comprises a plurality of through-openings 59, the relevant elevations being arranged directly above the through-openings 59 when viewed in the vehicle seat height direction H. The plastics element 5 is not yet deformed here. Another further functional region can be seen in each of the figures.

FIGS. 7A to 9B show the suspension and damping element 4 from FIGS. 4A to 6B in a not yet fully spring-deflected position. As can be seen by comparing FIGS. 7B, 8B and 9B, the deformations of the plastics element 5 differ significantly, however, since the plastics element 5 is differently deformed depending on the functional region 8, 9, 10, depending on the extension of the elevations and depressions, the first functional region 8 causing uniform action of pressure on the plastics element 5. The further the elevations extend, the smaller the compressive load on the plastics element 5, since more material can escape into the depressions during the suspension process, as can be clearly seen from the figures. Of course, the number of recesses 21, in this case the through-openings 59, also plays an important role when adjusting the spring characteristics of the suspension and damping element 4. The more through-openings 59 are present, the flatter is the spring characteristics of the suspension and damping element 4, irrespective of the position of the adjusting means 6 in question.

Figure 10A:
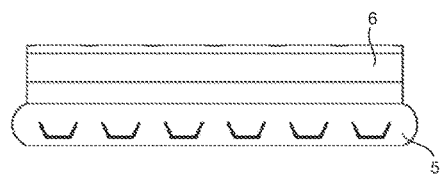
FIG. 10A is a front view of the suspension and damping element according to FIG. 1, in a fully spring-deflected state and in the first position.
Figure 10B:
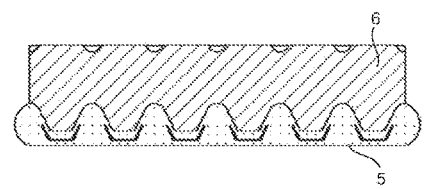
FIG. 10B is a cross section of the suspension and damping element according to FIG. 10A.
Figure 11A:
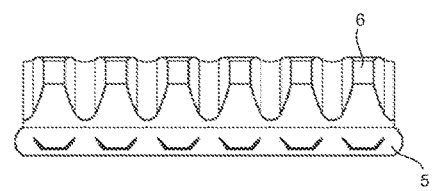
FIG. 11A is a front view of the suspension and damping element according to FIG. 1, in a fully spring-deflected state and in the second position.
Figure 11B:
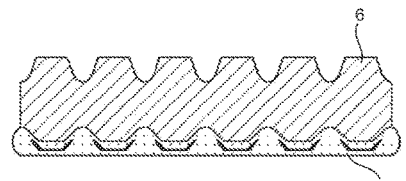
FIG. 11B is a cross section of the suspension and damping element according to FIG. 11A.
Figure 12A:
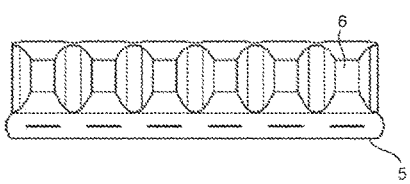
FIG. 12A is a front view of the suspension and damping element according to FIG. 1, in a fully spring-deflected state and in the third position.
Figure 12B:
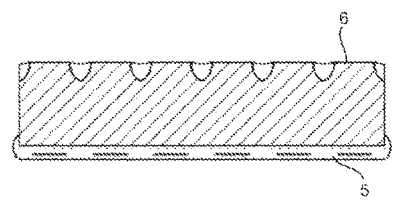
FIG. 12B is a cross section of the suspension and damping element according to FIG. 12A.

As can be seen from comparing FIGS. 10A and 10B with FIGS. 11A, 11B, and 12A and 12B, the plastics element 5 is deformed to different extents, depending on the functional region 8, 9, 10 that is acting on the plastics element 5 and is operatively connected to the plastics element 5.

It can be seen from FIGS. 10A to 12B that the suspension and damping element 4 is fully spring-deflected, i.e. the plastics element 5 is maximally deformed in each case. A different maximum deformation can be seen depending on the functional region 8, 9, 10 in question, the first functional region 8 causing greater deformation than the second 9 or third functional region 10. The spring characteristics of the suspension and damping element 4 behave correspondingly.

Figure 13A:
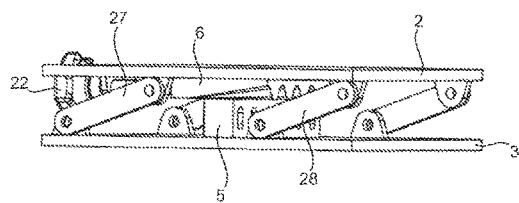
FIG. 13A is a perspective view of the vehicle seat according to FIG. 3.
Figure 13B:
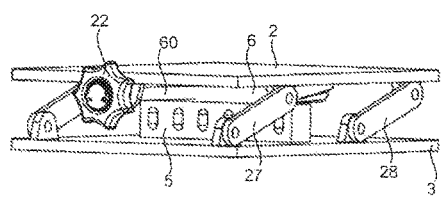
FIG. 13B is a further perspective view of the vehicle seat according to FIG. 3.

FIGS. 13A and 13B are different perspective views of FIG. 3.

Figure 14A:
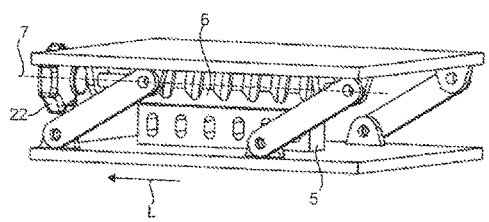
FIG. 14A is a perspective view of an alternative embodiment of the vehicle seat.
Figure 14B:
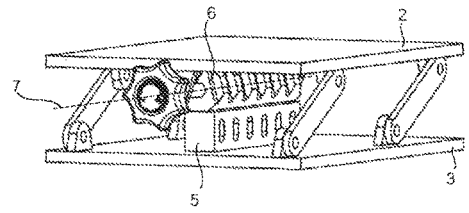
FIG. 14B is a further perspective view of the vehicle seat according to FIG. 14A.

FIGS. 14A and 14B show an alternative embodiment of FIG. 1, the adjusting means 6 extending in the vehicle seat length direction L and the rotational axis 7 also extending in the vehicle seat length direction L. The plastics element 5 also extends in the vehicle seat length direction L.

Figure 15A:
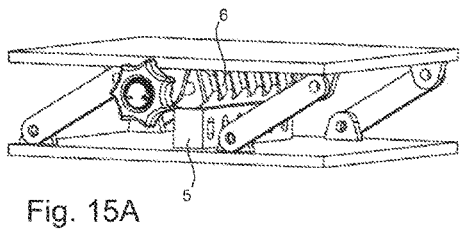
FIG. 15A is a perspective view of the vehicle seat according to FIG. 1.
Figure 15B:
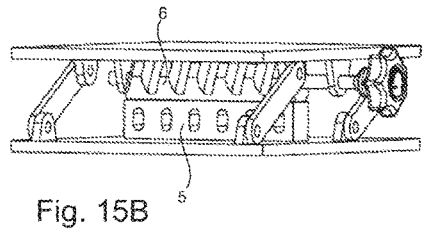
FIG. 15B is a further perspective view of the vehicle seat according to FIG. 15A.

FIGS. 15A and 15B are further different perspective views of FIG. 1.

Figure 16A:
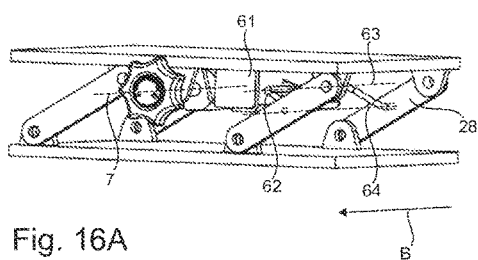
FIG. 16A is a perspective view of the vehicle seat according to a further alternative embodiment.
Figure 16B:
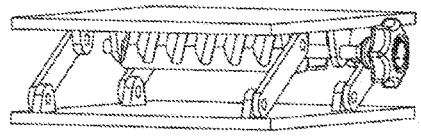
FIG. 16B is a further perspective view of the vehicle seat according to FIG. 16A.

FIGS. 16A and 16B show a further alternative embodiment, in this case the adjusting means 6 being connected to the vehicle seat upper part 2, and the rotational axis 7 being arranged so as to extend in the vehicle seat width direction B.

Furthermore, the plastics element 5 is connected to the vehicle seat upper part 2 by means of a retaining element 61, the retaining element 61 being connected to the second connecting link 28 by means of a bracket element 62. The bracket element 62 is connected to the retaining element 61 so as to be pivotable about a fifth swivel axis 63, and is connected to the second connecting link 28 so as to be pivotable about a sixth swivel axis 64.

All the features disclosed in the application documents are claimed as being essential to the invention, provided that, individually or in combination, they are novel over the prior art.

LIST OF REFERENCE SIGNS 1 vehicle seat
2 vehicle seat upper part
3 vehicle seat lower part
4 suspension and damping element
5 plastics element
6 adjusting means
7 rotational axis
8 first functional region
9 second functional region
10 third functional region
11 first elevation
12 first depression
13 second elevation
14 second depression
15 third elevation
16 third depression
17 first region
18 second region
19 fourth depression
20 fourth elevation
21 recess
22 adjusting element
23 first swivel axis
24 second swivel axis
25 third swivel axis
26 fourth swivel axis
27 first connecting link
28 second connecting link
29 body
30 positioning element
31 first end of the first connecting link
32 second end of the first connecting link
33 first end of the second connecting link
34 second end of the second connecting link
35 planar portion
36 first region
37 second region
38 first bearing point
39 second bearing point
40 direction
41 direction
42 planar region
43 planar region
44 first distance
45 second distance
46 first end region
47 second end region
48 eccentric shaft
49 contact surface
50 upper surface
51 edge
52 first edge region
53 second edge region
54 curved region
55 angle
56 distance
57 base surface
58 rounding
59 through-opening
60 rotational axis 61 retaining element
62 bracket element
63 fifth swivel axis
64 sixth swivel axis
65 K1 first circle
66 K2 second circle
M1 first centre
M2 second centre
L vehicle seat length direction
B vehicle seat width direction
H vehicle seat height direction

What is claimed is:

1. A vehicle seat comprising a vehicle seat upper part and a vehicle seat lower part, the vehicle seat upper part being movable relative to the vehicle seat lower part, and the vehicle seat upper part being sprung and damped, relative to the vehicle seat lower part, by a suspension and damping element,
wherein
the suspension and damping element comprises a reversibly deformable plastics element and an adjusting element, the plastics element and the adjusting element being in operative contact, and the spring characteristics of the suspension and damping element being able to be adjusted depending on the position of the adjusting element relative to the plastics element.

2. The vehicle seat according to claim 1, wherein the adjusting element has a rotational axis that extends in a vehicle seat width direction or a rotational axis that extends in a vehicle seat length direction, the adjusting element being mounted so as to be rotatable about said rotational axis, and has at least three different functional regions, a first functional region being rectangular, a second functional region comprising first elevations and first depressions that are arranged perpendicularly to the vehicle seat width direction, and a third functional region comprising second elevations and second depressions that are arranged perpendicularly to the vehicle seat width direction or perpendicularly to the vehicle seat length direction.

3. The vehicle seat according to claim 1, wherein the adjusting element has a rotational axis that extends in a vehicle seat width direction or a rotational axis that extends in a vehicle seat length direction, the adjusting element being mounted so as to be rotatable about said rotational axis, the adjusting element being formed as a shaft comprising third elevations and third depressions, a depression following an elevation in each case, and an elevation following each depression, viewed in the vehicle seat width direction or in the vehicle seat length direction, the elevations tapering eccentrically in cross section when viewed in the vehicle seat width direction or in the vehicle seat length direction.

4. The vehicle seat according to claim 1, wherein the adjusting element can be moved in a vehicle seat length direction and is substantially cuboid, the adjusting element having first regions, the extent of which, in a vehicle seat height direction, continuously increases to the front or to the rear, viewed in the vehicle seat length direction, in order to form fourth depressions, and second regions which form fourth elevations, viewed in the vehicle seat height direction.

5. The vehicle seat according to claim 1, wherein the plastics element is substantially cuboid, and comprises at least one recess which is preferably formed as a through-opening in the vehicle seat length direction or in the vehicle seat width direction.

6. The vehicle seat according to claim 1, wherein the adjusting element can be actuated by actuating an adjusting element.

7. The vehicle seat according to claim 2, wherein the elevations of the adjusting element are arranged above recesses of the plastics element when viewed in the vehicle seat height direction.

8. The vehicle seat according to claim 1, wherein the plastics element can be deformed by the adjusting element when the vehicle seat upper part moves relative to the vehicle seat lower part, which deformation can cause damping of the movement of the vehicle seat upper part.

9. The vehicle seat according to claim 1, wherein the vehicle seat upper part and the vehicle seat lower part are interconnected by means of a scissor-action frame, or the vehicle seat upper part has a first and at least one second swivel axis, and the vehicle seat lower part has a third and a fourth swivel axis, the first and third swivel axes being interconnected by means of at least one first connecting link, and the second and fourth swivel axes being interconnected by means of at least one second connecting link.

10. The vehicle seat according to claim 1, wherein the plastics element consists of Cellasto and/or Vulkollan at least in part.

11. The vehicle seat according to claim 1, wherein the adjusting element is connected to the vehicle seat upper part and the plastics element is connected to the vehicle seat lower part, or the adjusting element is connected to the vehicle seat lower part and the plastics element is connected to the vehicle seat upper part.

12. The vehicle seat according to claim 1, wherein the adjusting element is formed of a plastics material or a metal.

* * * * *